No. 809,685. PATENTED JAN. 9, 1906.
C. D. HELLSTRÖM.
LINER FOR CENTRIFUGAL LIQUID SEPARATORS.
APPLICATION FILED JUNE 9, 1905.
2 SHEETS—SHEET 1.
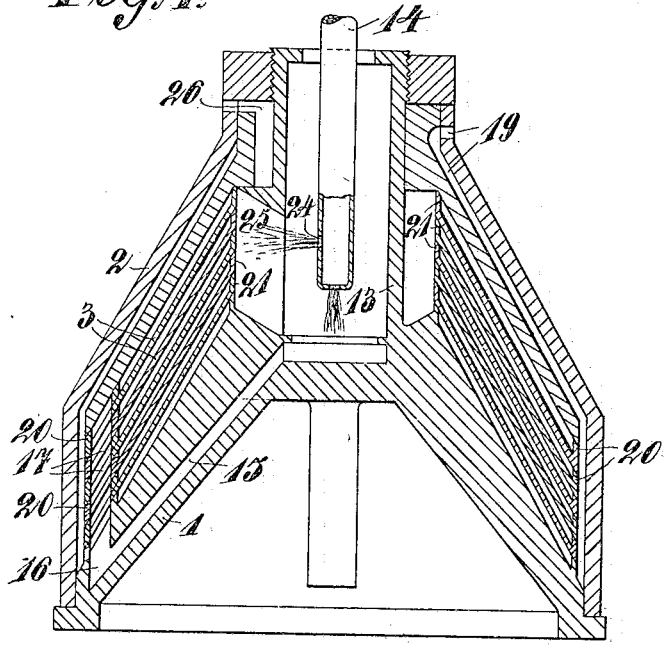
Witnesses:
James F. Duhamel
William J. Firth
Inventor,
CARL DIDRIK HELLSTRÖM,
by Henry Connett
his Attorney.

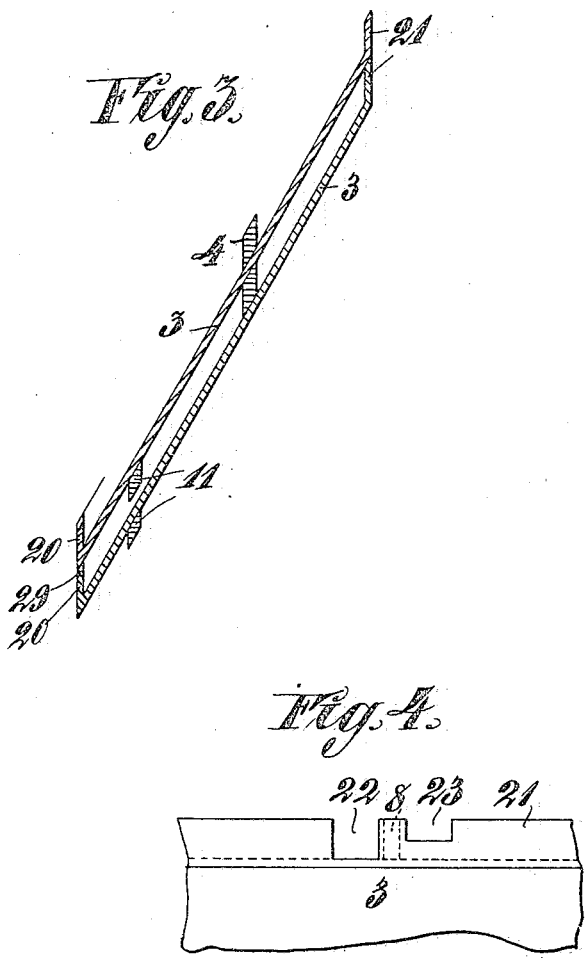

UNITED STATES PATENT OFFICE.

CARL DIDRIK HELLSTRÖM, OF NYFORS, SWEDEN.

LINER FOR CENTRIFUGAL LIQUID-SEPARATORS.

No. 809,685.   Specification of Letters Patent.   Patented Jan. 9, 1906.

Application filed June 9, 1905. Serial No. 264,468.

*To all whom it may concern:*

Be it known that I, CARL DIDRIK HELLSTRÖM, a subject of the King of Sweden and Norway, and a resident of Nyfors, Eskilstuna, in the Kingdom of Sweden, have invented certain new and useful Improvements in Liners for Centrifugal Liquid-Separators, of which the following is a specification, reference being had therein to the accompanying drawings.

For augmenting the effect of centrifugal liquid (milk) separators a liner is generally mounted in the drum, as is well-known, said liner containing a plurality of narrow spaces cutting the radius of the drum, in which spaces the separation of the different heavy liquids is effected in such manner that the heavy liquid passes along the outer side wall of the spaces outward toward the periphery of the drum, while the light liquid passes along the inner side wall of the spaces inward toward the center of the drum. The most general form of the liner, perhaps, is a plurality of superposed plate-funnels of conical or pyramidal shape, which form a pile in the drum concentric with the axis of rotation of the same. As easily conceived, the increasing of the effect is due to the liquid bulk being divided into a great number of thin layers, in each of which separation of the different heavy liquids takes place or, briefly, in each space forming, so to say, a small centrifuge. This being the case, the effect ought to be greater, one may think, the greater the number of the plate-funnels is or, which is the same, the narrower the said spaces are. However, this presumption is correct only to a certain limit, which is reached very soon, owing partly to the fact that the different liquid currents in the narrow spaces, which currents also form some kind of layers, counteract each other, partly to the fact that the capillarity has a checking effect, to which must be added that from the separated cream gathering near the center of the drum a rather hard slowly-running (butter-like) mass is generated, which only with difficulty can be pushed away by the following cream mass.

The object of this invention is to remove the said disadvantages in such manner that each space without being extremely narrow is made more effective than hitherto. The said object is gained by introducing the full milk into the space at the periphery of the same, so that the blue milk is separated to the largest extent in the widest part of the space, and consequently has to pass no long way from within and outward through the same; further, by the milk being compelled, by ribs extending upward in an oblique direction and being of the same height as the space, to spread in the space forward in the rotary direction of the drum from the inlet-opening for the full milk situated just in front of each rib, the said ribs guiding at the same time the cream inward toward the center of the drum; further, by the blue milk, by ribs which are lower than those first mentioned, to a considerable extent being prevented from making its way upward in the space, while the separated cream under the same ribs can pass inward toward the center, and, finally, by a small part of the full milk in front of ribs of the same height as those first mentioned being guided into the space nearer the center in such manner that the cream will be removed more quickly.

In the accompanying drawings, Figure 1 is a vertical section on the line A B of Fig. 2 of the drum with some plate-funnels mounted in the same. Fig. 2 is a plan view of the drum, the cover being removed, so that a funnel is visible. Fig. 3 is a section of two funnels, on an enlarged scale, on the line A' B' of Fig. 2. Fig. 4 shows a part of the inner edge of a funnel.

1 designates the lower part of the drum, or the bottom. 2 is the top part of the drum, and 3 3 are the plate-funnels. On the upper side of each funnel ribs 4 are provided at equal distances from each other along the circumference of the funnel, one part 5 of the said ribs extending straight upward from the said circumference, while the next part 6 extends forward parallel with the circumference, and a subsequent longer part 7 extends upward in an oblique direction. Near the center there are other angular ribs on the upper side of the funnel, having the point of the angle directed outward, and one leg 8 on a line with or substantially on a line with the rib part 7, without, however, hanging together with the same, a narrow passage 10 being thus formed. The other leg 9 of the angular rib, situated below the leg 8, is concentric with the aperture of the funnel. The height of the said ribs 4 and 8 9 is equal to the height of the space between each two funnels, the upper funnel resting with its under side on the ribs on the lower one. On the under side of each funnel ribs 11 are provided, the number of which is equal to the number of the ribs 4. The said ribs 11 are situated near the lower edge of the funnel on a level with the rib parts 6 and are parallel or substantially parallel with the said edge, a narrow passage 12 being provided between one end of the rib 11 and the opposite rib 4. The height of the said rib 11 is somewhat less than that of the space between the funnels, as shown in Fig. 3. The full milk enters a central chamber formed by a tube 13 through the pipe 14, passes from the said chamber outward toward the side wall of the drum through the bottom passage 15, and then upward through an aperture 16 and an aperture 17, provided in each of the funnels, into the spaces between the funnels. The said aperture 17 is situated below the circle formed by the ribs 11 and also below the rib part 6. Another aperture 18 provided in the outer edge of the funnel, forms a passage for the blue milk, leaving the drum through the channel 19. The outer edge 20 of each funnel is bent upward, forming an outer rib, closing the space between each two funnels but for a very narrow aperture 29 at the superposed funnel, through which aperture, which does not extend past the aperture 17, generated cheese and the like can pass outward to the side wall of the drum. The inner edge of each funnel is bent upward in the same manner, forming a rib 21, closing the said space but for two adjacent apertures 22 23, separated by the rib part 8. The said aperture 22 forms an outlet-opening for the cream, while the aperture 23, provided in the top part of the said edge, forms an inlet-opening for a small quantity of full milk, which from an opening 24 in the side wall of the pipe 14 passes through an aperture 25, provided in the central tube 13 opposite the said aperture 23. 26 is the exit-passage for the cream. Each section or third part of the space is provided with inlet and outlet apertures, arranged as described. During the continual introduction of full milk a state of continuance will ensue, and the result of the procedure is, as well known, that the heavy liquid, or the blue milk, gathers at the periphery and the light one, or the cream, at the part of the rotating liquid bulk situated near the axis of rotation, at which places the liquids are led off continually. Hitherto the supplying of the full milk generally has been effected at or in the vicinity of more central parts of the rotating milk bulk, where, as stated above, the light liquid part or the cream gathers. Attempts have been made to effect the said supplying "behind the cream"—i. e., at such a place where the milk has substantially the same weight as the entering full milk—in order to prevent perturbations in the said currents passing outward and inward, respectively. It might probably be evident that the main portion of the full milk immediately after the entering of the milk into the space places itself at the outside of the layer—i. e., at the inside of the nearest upper plate-funnel—and participates in the movement of the current passing outward. The object of the centrifugal force now is, in spite of the said current, to cause the fatty globules to pass from the outside of the layer toward the inside of the same, which as for the great globules probably takes place even in the zone of introduction, and as for the other globules, as they, while the milk passes outward, passes zones where the centrifugal force can overcome the action of the current. From this it will appear that a sizing of the fatty globules is effected, so that there are only small ones at the outer edge of the plate-funnel. Now the skimming operation is dependent on the velocity of the milk bulk at the outer edge of the funnel and on the amount of the centrifugal force, and at the very outer edge of the layer only a small quantity of fatty globules will probably be transferred to the inner side of the layer. Owing to this fact, the current passing inward will probably be very inconsiderable at the said place. This explanation having been made, the novelty of the action of the construction now in question will easily be comprehended. In whatever manner the milk be led into the drum the blue milk will always occupy a position at the outer edge of the space, provided separation takes place. If now the full milk is led into the drum near the periphery of the same, (through the apertures 17,) the said milk will not be able, at least not for a greater quantity, to fill the space, as the blue milk everywhere strives to keep its place at the outer side of the layer. If there were no obstacles in the path of the full milk, the milk, owing to the fact that it is lighter, would run the shortest way toward the center along the inner side of the layer or the outer side of the funnel in a not very spread current. This is prevented by the rib part 6 concentric with the funnel edge, which part, in combination with the part 5, also causes the full milk to rise in all funnels, so that all spaces are supplied with full milk in proportion to the skimming capacity of the apparatus. The radial rib part 5 prevents the full milk from spreading to the exit-opening 18, which might be provided. It may be observed that the exit-openings for the blue milk can be situated nearer the center—viz., at 23—as will be explained below. Owing to the said obstacles, the full milk is caused to spread under the blue milk outside the narrow rib 11 and to pass gradually under the said rib, entering the room inside the rib, where it is caused by the blue milk supported by the rib 11 to remain in a thin layer. The greatest fatty globules are separated immediately after the entering of the full milk into the space. In order to permit the same to pass inward, the passage 12 is provided between the high rib 4 and the low rib 11. The rib 7, extending upward in an oblique direction, is adapted to prevent the lighter part first separated from rushing inward. Owing to this fact, a light layer will gather, which, supported by the said rib part, in its turn prevents the layer entering under the low rib 11 from rushing inward. However, the light layer supported by the rib part 7 would at last get such a thickness that rushing would take place. This is prevented by the rib part 9 concentric with the funnel-aperture. The passage 10 between the rib 8 9 and the rib part 7 serves as an exit-opening for the cream, which then continues to move inward above and along the rib part 8, extending upward in an oblique direction. An exit-opening for light layers formed farther on in the rotary direction is provided between the rib part 9 and the next oblique rib part 7. Consequently the separation of the fatty substances when the milk is introduced in the manner stated above is effected in such manner that the full milk is compelled to spread in a thin layer, which must move inward as long as it is lighter than the blue milk before present in the liner—i. e., as long as it contains separable fatty substance. The separation of the fatty globules is thereby facilitated in a double manner. The centrifugal force, which when the milk is introduced in another manner must cause the fatty globules to pass the whole way from the outer edge of the space to the inner edge of the same against a current, has now to move the said globules only a fractional part of the said way, assisted by a current. The separation of the fatty substances will then become almost independent of the velocity of the entering milk, and consequently, in some degree, of the quantity introduced, the effect being thus considerably increased.

Instead of the blue milk being led off at the periphery of the liner it may be led off through the aperture 23, as stated above, the angular rib 8 9 then serving to prevent separated fatty substance from passing to the said exit-opening 23. In such a case the rib 8 9 may be so arranged as to form a chamber in combination with the upward-bent edge 21, which chamber is closed but for a narrow opening in the said rib at the upper side of the layer. As stated above, the blue milk may be led off through the aperture 18. In the latter case the inner part of the space would possibly be obstructed by fatty substance, especially if small quantities of cream are led off. This is prevented by introducing through the said opening 23 a small quantity of full milk, which, supported by the tightly-fitting angular rib, is caused to spread toward the cream-exit opening, and consequently leaves only a narrow passage for the cream, through which it is fed into the common-outlet channel. The high ribs 4, extending upward partly in an oblique direction to the generatrix partly perpendicularly to the same peripherally, may be fixed either to the upper side of the lower funnel or to the lower side of the upper funnel. The rib 11 may be perpendicular to the generatrix of the funnel peripherally, as shown in the drawings, or in a somewhat oblique direction to the same. The apertures 17 may be provided at a shorter or longer distance from the rib 4, but must, however, be situated inside an angle, the legs of which pass through the center of the drum and the ends of the rib 4. The rib 8 9 may have the point of the angle more or less rounded, thus forming a curve. The ribs may be made either by strips being fixed to the funnels or by the material of the funnels being pressed upward.

Having now described my invention, what I claim as new, and desire to secure by Letters Patent, is—

1. A liner for centrifugal liquid-separators consisting of a plurality of superposed and spaced funnel-like plates, provided with apertures 17 near their outer periphery, with a rib 20 extending along the same and situated outside the said apertures, and with ribs 4 extending from the said periphery inward toward the center of the plate, causing the full milk led to the periphery of the liner to rise through the apertures and spread in all the spaces.

2. The combination of a liner for centrifugal liquid-separators, consisting of a plurality of superposed and spaced funnel-like plates provided with apertures 17 near the outer periphery, with a rib 20 extending along the same and formed by the plate edge being bent upward, and further with ribs 4 extending from the said rib, inward toward the center of the plate, and of a central feeding-chamber communicating through bottom channels 15 with the said apertures of the liner, situated one above the other, for the introducing of the full milk into all the spaces at the periphery of the liner, substantially as described.

3. The combination of a liner for centrifugal liquid-separators, which liner consists of superposed and spaced funnels, provided near the periphery with apertures 17 and with a rib 20, extending along the periphery of the funnel, and with ribs 4 extending from the said rib 20 inward toward the center of the funnel, and of a central feeding-chamber, communicating through bottom channels 15 with the said apertures 17 and an inlet-tube 14, which, in addition to an aperture leading the full milk to the bottom channels 15, has a side opening 24, leading a part of the full milk into the spaces between the funnels, at the inner edges of same.

4. A liner for centrifugal liquid-separators consisting of superposed and spaced funnel-shaped plates, provided near the periphery with apertures 17, leading the full milk to the spaces between the funnels, and with ribs 20, 21 formed by the outer and inner edges respectively of the plate being bent upward, and with ribs 4 extending from the periphery of the plate toward the center of same and forward in the rotary direction, and further with apertures 22 in the inner edge rib 21, through which the cream can leave the space between the plates, and with apertures 23 in the said rib 21, through which a part of the full milk is led from the center of the liner into the said space, substantially as described and for the purpose set forth.

5. A liner for centrifugal liquid-separators consisting of superposed and spaced funnel-like plates, provided near the periphery with apertures 17, with a rib 20 extending along the periphery of the plate and formed by the edge being bent upward, with ribs 4, extending from the said rib 20 inward toward the center of the plate, and with ribs 11 extending along the outer edge of the plate at some distance from the same, a passage being provided between the said rib 11 and the opposite transversal rib 4 and also between the rib 11 and the next plate, so that the light part of the liquid can pass along the surface of said plate, substantially as described and for the purpose set forth.

6. A liner for centrifugal liquid-separators consisting of superposed, spaced funnel-shaped plates, provided with apertures 17, leading the full milk to the spaces between the plates, and with ribs 4 which owing to their radial position on the plate and in combination with ribs 20, 21, formed by the inner and outer edges of the plate being bent upward, divide the space into sections, each provided with an inlet-opening 17 and an outlet-opening 18, and further with ribs 8, 9 situated nearer the inner edge of the plate in comparison with the said ribs 4 and forming a continuation of the same after an interval 10, substantially as described and for the purpose set forth.

7. A liner for centrifugal liquid-separators consisting of superposed, spaced funnel-like plates provided at the periphery with apertures 17 for the introducing of the full milk, and near the periphery with apertures 18 forming outlet-openings for the blue milk, the said apertures 17 and 18 being provided inside a rib extending along the periphery of the plate and formed by the edge being bent upward, and further with ribs 4 and 8, 9 extending in an oblique direction to the radius of the plate between the outer edge and the inner edge of the plate but leaving a passage 10 for the light part of the liquid, so that it can pass to the outlet-opening 22 at the inner edge of the plate.

8. A liner for centrifugal liquid-separators consisting of superposed spaced funnel-like plates provided with ribs concentric with or substantially concentric with the center of the funnel, some ones 20, 11 of the said ribs being situated near the outer edge of the plate and other ones 9, 21 near the inner edge of the same, and with apertures 17 near the outer edge for the introducing of the full milk into the spaces between the plates, and with apertures 18 forming outlet-openings for the blue milk, and further with ribs 4, and 8, 9 which form an angle with the said ribs and divide the space into sections, each having an inlet-opening 17 and an outlet-opening 18 substantially as described and for the purpose set forth.

9. A liner for centrifugal liquid-separators consisting of superposed spaced funnel-like plates provided at their inner and outer edges with ribs concentric or substantially concentric with the center of the funnels, inlet-openings 17 and outlet-openings 18 for the full milk and the blue milk respectively, outlet-openings 22 for the cream, ribs 4, guiding the full milk along the plate-surface inward toward the center of the plate, and angular ribs 8, 9 forming a further guide for the cream toward the outlet-opening 22, substantially as described and for the purpose set forth.

10. A liner for centrifugal liquid-separators consisting of superposed, spaced funnel-like plates, provided near their periphery with inlet-openings for the full milk and outlet-openings for the blue milk, and on the upper side with ribs, extending from the periphery of the plate inward toward the center of the plate in an oblique direction and causing the full milk to spead on the upper side of the plate or funnel, and on their under side with ribs 11, guiding the blue milk separated from the full milk and passing outward toward the outlet-opening 18, substantially as described and for the purpose set forth.

In witness whereof I have hereunto signed my name in the presence of two subscribing witnesses.

CARL DIDRIK HELLSTRÖM.

Witnesses:
A. F. LUNDBORG,
ROBERT APELGREN.